United States Patent
Torno et al.

(10) Patent No.: US 6,529,817 B2
(45) Date of Patent: Mar. 4, 2003

(54) APPARATUS FOR KNOCK DETECTION WITH DIGITAL SIGNAL ANALYSIS AND METHOD OF DETECTING KNOCK USING SAME

(75) Inventors: Oskar Torno, Schwieberdingen (DE); Axel Heinstein, Wimsheim (DE); Carsten Kluth, Stuttgart (DE); Werner Haeming, Neudenau (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/765,694

(22) Filed: Jan. 22, 2001

(65) Prior Publication Data
US 2001/0011204 A1 Aug. 2, 2001

(30) Foreign Application Priority Data
Feb. 1, 2000 (DE) .......................... 100 04 166

(51) Int. Cl.$^7$ .............................................. G01L 23/22
(52) U.S. Cl. ...................................... 701/111; 73/35.04
(58) Field of Search ....................... 701/111; 73/35.01, 73/35.03, 35.04, 35.05, 35.06

(56) References Cited

U.S. PATENT DOCUMENTS 4,945,876 A * 8/1990 Nakaniwa ................ 123/406.3
6,246,952 B1 * 6/2001 Honda ........................ 701/111

FOREIGN PATENT DOCUMENTS

DE   31 37 016 C2   1/1985

* cited by examiner

Primary Examiner—Andrew M. Dolinar
(74) Attorney, Agent, or Firm—Michael J. Striker

(57) ABSTRACT

The apparatus detects knock in an internal combustion engine with at least one knock sensor associated with a cylinder of the internal combustion engine. The apparatus initially processes the analog knock sensor output signals in an analog signal preparing device (18), which can include a multiplexer and analog/digital converter, but the actual knock detection occurs only in a purely digital signal analysis device (19), which processes the prepared and digitized knock sensor output signals. The digital signal analysis device (19) extracts at least one knock index and compares it with predetermined threshold values for knock detection, preferably considering a reference value for knock-free operation. A method of detecting knock is also described which is based on the use of this apparatus.

10 Claims, 1 Drawing Sheet

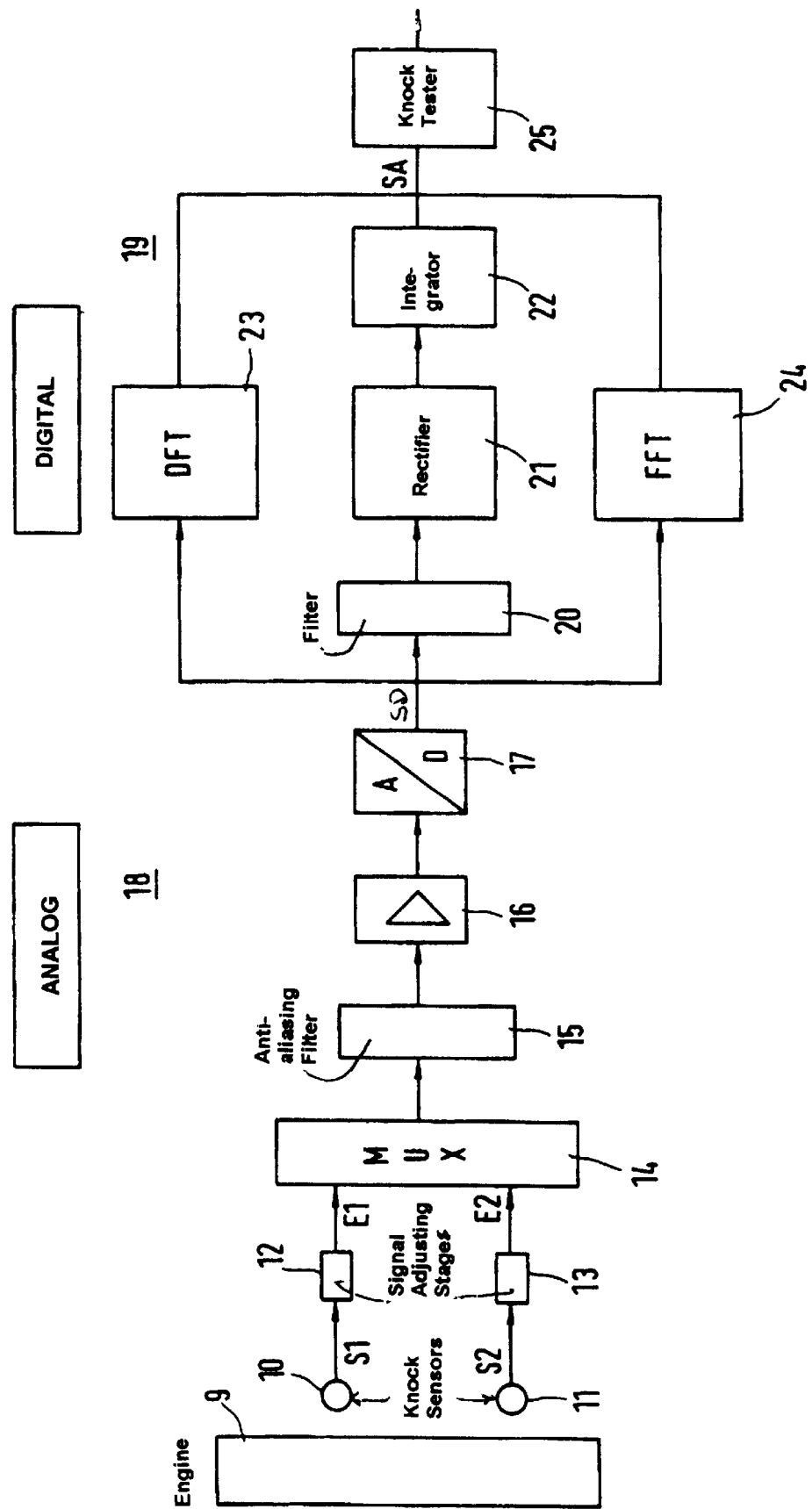

APPARATUS FOR KNOCK DETECTION WITH DIGITAL SIGNAL ANALYSIS AND METHOD OF DETECTING KNOCK USING SAME

BACKGROUND OF THE INVENTION

1. Field of the Invention

The present invention relates to an apparatus for knock detection in an internal combustion engine and, more particularly, to an apparatus for knock detection comprising one or more knock sensors for detection of oscillations produced during knocking combustion events in an internal combustion engine and means for analyzing the signals from the knock sensors, which includes at least one input, a multiplexer and an analog/digital converter and which converts the analog signals supplied by or from the knock sensor into digital signals.

2. Prior Art

Under certain operating conditions in an internal combustion engine knocking combustion can occur, which is to be prevented. Knock sensors are associated with each cylinder or certain predetermined cylinders of the internal combustion engine, which supply output signals, which have fluctuating or oscillating components characteristic of knock when knock is occurring. The evaluation of the signals supplied by the knock sensors is difficult, since background and/or interference noise is present besides the portion of the signal originating from knock. The noise depends on various operating conditions, for example on the rotation speed or the load on the internal combustion engine.

There have already been a number of proposals for overcoming these difficulties. These proposals usually involve analog signal processing methods. In these methods both the signals characteristic of knock and also the background signals are determined by means of analog signal processing.

The apparatus for detection of knock in an internal combustion engine, in which the signal processing occurs at least partially with the help of a digital signal analyzing device, is described for example in German Patent DE-PS 31 37 016. In this known apparatus for knock detection the signal supplied by the knock sensor, which includes the portion of the signal characteristic of knock and the background portion, is amplified, filtered, rectified and integrated with the help of an analog component or circuit. The integrated signal is compared with a background signal, which is obtained by suitable filtration from the integrated signal. For determination of the background portion of the signal the integrated signal is first converted with an analog to digital converter and then processed with the help of a digital filter. The comparison of the integrated values with the background signals obtained by the digital filtration allows the knock to be detected. Knock is recognized when the integrated signal values deviate in a known manner from the background signal.

The analog circuits are usually built as integrated circuits. These analog ICs are rather inflexible and do not always satisfy the growing operational requirements for signal analysis. Several filters are placed in the analog analysis ICs. The filter that provides the best knock detection must then be determined. If several resonance frequencies clearly stand out in the knock signal or a significant noise frequency is present, the knock signal is usually unsatisfactory for knock detection or noise and background can only be masked out in an unsatisfactory manner.

SUMMARY OF THE INVENTION

It is an object of the present invention to provide an improved apparatus for detection of knock in an internal combustion engine, which does not have the above-described deficiencies.

It is also an object of the present invention to provide a method of knock detection using the improved apparatus.

These objects and others, which will be made more apparent hereinafter, are attained in an apparatus for detecting knock in an internal combustion engine comprising one or more knock sensors for detection of oscillations produced by the knocking combustion and means for knock signal preparation, which include at least one input, a multiplexer and an analog/digital converter and which convert the analog output signals from or by the knock sensor or sensors into a digital output signal.

According to the invention the apparatus includes at least two symmetric knock sensor inputs for signals from respective knock sensors and digital signal processing circuit means, which analyzes a digitized signal from the knock sensors, includes means for determining whether or not knock is occurring from the digitized signal. The means for determining whether or not knock is occurring preferably includes at least one digital filter device.

The apparatus for detection of knock in an internal combustion engine has the advantage that several frequencies are analyzed and interference frequencies that are present in the signal that is obtained can be suppressed. This provides an advantageous project-specific flexibility, which leads to improved knock detection, which is better than that obtained currently with analog signal processing means. Furthermore a differential signal analysis of the connected knock sensors is possible, which has the advantage that the coupling of interference with the knock signals is additionally minimized.

The apparatus according to the invention has only one analog input circuit, which supplies the knock sensor signals and performs a first signal preparation. The actual signal analysis and knock detection occurs only in a purely digital circuit portion. This digital circuit portion includes signal processing means, for example a filter, which are easily adjustable to the requirements to be expected, which allow a project-specific flexibility and which leads to improved knock detection. The digital signal processing means advantageously permits an energy analysis or a peak analysis of the sensor signals.

Preferred embodiments of the apparatus for detection of knock in an internal combustion engine are described in the following. It is particularly advantageous that different embodiments of the digital signal processing means can be provided without great effort or expense. Advantageously the analog input-preparing part of the different apparatus according to the invention is identical for all alternative digital solutions according to the invention.

The following components are useful in preferred alternative embodiments for the digital signal processing means for energy analysis: a filter, a rectifier or squaring circuit and integrator connected in series or means for performing a discrete Fourier Transformation (DFT) or means for performing a rapid Fourier Transformation (FFT). All three alternatives permit analysis of several frequency ranges and suppression of interference frequencies that are present. One or more knock indicators for combustion are then produced from this analysis. They are then compared with threshold values in order to decide whether or not knock is occurring or not. In this comparison reference values for knock-free operation are also considered.

BRIEF DESCRIPTION OF THE DRAWINGS

An embodiment of the apparatus for knock detection in an internal combustion engine according to the invention is illustrated in the sole FIGURE and explained in detail in the following detailed description.

DESCRIPTION OF THE PREFERRED EMBODIMENT

The embodiment of the apparatus according to the invention shown in the sole figure has two knock sensors 10 and 11, which are associated with respective cylinders of an unshown internal combustion engine. The respective output signals S1 and S2 from the knock sensors 10 and 11 are supplied to corresponding signal adjusting circuits 12 and 13 and are prepared so that they can be conducted or fed by multiplexer 14 in a predetermined manner.

An analog signal preparation means 18 comprises a multiplexer 14 having two symmetric knock sensor inputs E1, E2, a filter 15, for example an anti-aliasing filter, a following amplifier 16 and an analog/digital converter 17. The actual knock detection takes place in a digital signal analysis means 19 connected to the analog signal preparation means or portion 18. The signal SD supplied by the analog/digital converter 17, which is a digital signal, is input into the digital signal analysis means 19.

The digital signal analysis means or the digital signal analysis means 19, for example, can be in three different embodiments. First, the digital signal analysis means 19 can include a filter 20, a rectifier 21 and an integrator 22 or it can include means for performing a discrete Fourier Transformation (DFT) 23 or means of performing a rapid Fourier Transformation (Fast Fourier Transformation FFT) 24. Which digital signal analysis means 19 is used depends on the actual conditions or situation and can be adjusted to the signals that are available or can be selected according to the specific project. An analysis signal SA, which includes knock indices or indicators, is produced at the output of the digital signal analysis means 19. Knock that is occurring is determined in block 25 based on these knock indices or indicators. The block 25 can be a comparator or also a controller of the control unit of the internal combustion engine, which requires the knock detection for influencing certain parameters of the internal combustion engine, for example ignition. Generally the entire apparatus for knock detection can be part of the control unit of the internal combustion engine.

Differential signal analysis can be performed by the embodiment shown in the sole figure, in which several knock sensors 10, 11 are connected to a multiplexer 14 by means of symmetric input circuits. This circuit always only switches through the knock sensor that best detects the immediately running combustion. Subsequently the output signal of the multiplexer 14 is fed to the analog/digital converter 17 through the filter 15, for example an anti-aliasing filter, and, if necessary, through the amplifier 16.

Since the signal SD at the output of the analog/digital filter 17 is digital, the actual digital signal processing can then take place. This digital signal processing, which takes place in the digital signal analysis block or portion 19 includes an energy evaluation. Instead of an energy evaluation a peak value determination can be performed following the knock detection.

A process for energy analysis, which is already known in connection with an analog signal analysis circuit includes filtering the signals from the knock sensors, rectifying the filtered signals and integrating the rectified signals. Alternatively a discrete Fourier Transformation (DFT) or a Fast Fourier Transformation (FFT) can be performed. The three named analysis methods allow an analysis of several frequency ranges and a suppression of the interference frequencies. One or more knock indicators or indices for combustion events in a cylinder of the internal combustion engine result from this analysis. Knocking is detected when one or more of these knock indices exceed certain predetermined and adjustable threshold values. A reference value for knock-free operation is, for example, also considered in this comparison. One such reference value is then always obtained with the same analysis unit, when it is guaranteed that knock-free operation is occurring. Knock-free operation occurs during the named conditions of operation of the internal combustion engine. Since the knock detection according to the invention takes place in connection with a control unit of the internal combustion engine, which detects this operating condition, it is possible also to determine the reference value rkr from the signals SA and the knock values ikr.

Using the standard designations for knock value ikr reference value rkr knock detection threshold ke, then knock is detected if ikr/rkr>ke.

The above-described condition for knock detection, which for example is tested in the digital knock testing circuit portion 25, is also used in conventional knock detecting systems. However the method used in the apparatus according to the invention differs from the method of the prior art since a digital signal analysis is performed and the knock values, reference values and the knock detection threshold are respective digital values.

The signal processing occurs in different frequency ranges. The selection of the frequency ranges thus occurs so that the frequency ranges are preferred with high knock signal components and which suppress the interfering components (interference frequencies). The knock values ikr determined for individual frequencies produce knock indices, which are analyzed finally or knock detection.

The disclosure in German Patent Application 100 04 166.3 of Feb. 1, 2000 is incorporated here by reference. This German Patent Application describes the invention described hereinabove and claimed in the claims appended hereinbelow and provides the basis for a claim of priority for the instant invention under 35 U.S.C. 119.

While the invention has been illustrated and described as embodied in an apparatus and method for detecting knock in an internal combustion engine with a digital signal analysis means, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims:

1. An apparatus for detecting knock in an internal combustion engine, said apparatus comprising:

a plurality of knock sensors (10, 11) for detection of the presence of oscillations produced by knocking combustion in the internal combustion engine and for generation of respective analog output signals (S1, S2) according to said oscillations;

analog signal processing means (18) for processing said respective analog output signals (S1, S2), said analog signal processing means for said processing including at least two symmetric knock sensor inputs (E1, E2) for said respective analog output signals, a multiplexer and an analog/digital converter for converting said corresponding analog output signals into a digital output signals; and digital signal analysis means (19) comprising means for analyzing said digital output signal and means for determining whether or not knock is occurring from said digital output signal, wherein said digital signal analysis means (19) includes at least one digital filter (20), a rectifier (21) and an integrator (22) connected in series with each other, so that said rectifier (21) processes a filtered signal from the at least one digital filter and produces a rectified filter signal and said integrator integrates said rectified filtered signal.

2. The apparatus as defined in claim 1, wherein said digital signal analysis means (19) includes at least one digital filter (15).

3. The apparatus as defined in claim 2, wherein said digital signal analysis means (19) includes means for determining at least one knock index from at least one frequency range of said digital output signal.

4. The apparatus as defined in claim 3, wherein the at least one frequency range depends on at least one operating parameter of the internal combustion engine.

5. The apparatus as defined in claim 4, wherein said means for determining whether or not said knock is occurring includes means for determining whether or not said at least one knock index exceeds at least one threshold.

6. The apparatus as defined in claim 5, wherein said at least one threshold depends on at least one operating parameter of the internal combustion engine.

7. The apparatus as defined in claim 3, wherein said digital signal analysis means (19) determines at least one reference value for knock-free operation and determining whether or not said knocking is occurring from said at least one knock index and said at least one reference value.

8. The apparatus as defined in claim 3, wherein said means for determining whether or not said knock is occurring finds that said knock is occurring when a ratio of a knock value (ikr) and a reference value (rkr) is greater than a knock detection threshold (ke).

9. The apparatus as defined in claim 1, wherein said digital signal analysis means (19) includes a discrete Fourier transforming means (DFT) or a Fast Fourier transforming means (FFT).

10. A method of detecting knock in an internal combustion engine, said method comprising the steps of:

a) providing an apparatus including a plurality of knock sensor for detecting oscillations produced by knocking combustion events in the internal combustion engine and for generation of respective analog output signals (S1, S2) according to the oscillations, if present; analog signal preparation means (18) for processing the respective analog output signals (S1, S2) to form a digital output signal and digital signal analysis means (19) comprising means for analyzing said digital output signal and means for determining whether or not knock is occurring from said digital output signal;

b) analyzing at least one frequency range of the digital output signal to obtain a knock index with said digital signal analysis means, with the use of digital signal analysis means including at least one digital filter, a rectifier and an integrator connected in series with each other, so that the rectifier processes a filtered signal from the digital filter a produces a rectified filtered signal and the integrator integrates the rectified filtered signal d) finding that said knock is occurring if a ratio of said knock index (ikr) and said reference value (rkr) is greater than a knock detection threshold (ke).

* * * * *